United States Patent [19]
Pollet et al.

[11] Patent Number: 5,387,468
[45] Date of Patent: * Feb. 7, 1995

[54] SIZE COMPOSITION FOR IMPREGNATING FILAMENT STRANDS

[75] Inventors: Jean-Claude Pollet, Granville; Gary L. Williams; Gordon P. Armstrong, both of Newark; Martin C. Flautt; David L. Shipp, both of Granville, all of Ohio

[73] Assignee: Owens-Corning Fiberglas Technology Inc., Summit, Ill.

[ * ] Notice: The portion of the term of this patent subsequent to Jun. 18, 2008 has been disclaimed.

[21] Appl. No.: 6,558

[22] Filed: Jan. 21, 1993

Related U.S. Application Data

[63] Continuation of Ser. No. 722,431, Jun. 27, 1991, abandoned, which is a continuation of Ser. No. 269,088, Nov. 9, 1988, abandoned, which is a continuation of Ser. No. 24,951, Mar. 12, 1987, abandoned.

[51] Int. Cl.⁶ .......................... B32B 9/00; D02G 3/00
[52] U.S. Cl. ..................... 428/392; 428/372; 428/378; 428/391; 428/401; 65/448; 65/450
[58] Field of Search ............... 428/378, 392, 372, 391; 65/3.44, 3.43, 3.41

[56] References Cited

U.S. PATENT DOCUMENTS

| | | | |
|---|---|---|---|
| 2,778,764 | 1/1957 | Morrison | 428/392 |
| 3,450,658 | 6/1969 | Morrison | 428/392 |
| 3,498,826 | 3/1970 | Caroselli et al. | 428/392 |
| 3,776,880 | 12/1973 | Blackwell | 524/263 |
| 3,862,287 | 1/1975 | Davis | 264/131 |
| 4,139,576 | 2/1979 | Yoshimura et al. | 525/179 |
| 4,451,601 | 5/1984 | Blackwell | 524/263 |
| 4,590,104 | 5/1986 | Zeiner et al. | 427/389.9 |
| 5,024,890 | 6/1991 | Pollet et al. | 428/372 |
| 5,026,410 | 6/1991 | Pollet et al. | 428/372 |
| 5,312,687 | 5/1994 | Pollet et al. | 428/372 |

FOREIGN PATENT DOCUMENTS

| | | |
|---|---|---|
| 0058141 | 1/1982 | European Pat. Off. . |
| 1264432 | 2/1972 | United Kingdom . |
| WO9218433 | 10/1992 | WIPO . |
| WO9218559 | 10/1992 | WIPO . |

Primary Examiner—Patrick J. Ryan
Assistant Examiner—J. M. Gray
Attorney, Agent, or Firm—Ted C. Gillespie; Patrick P. Pacella

[57] ABSTRACT

An aqueous size composition for glass fibers is disclosed which includes a thermoplastic polymer resin powder, a coupling agent, and fugitive processing aids, such as binders or film formers. The composition is applied to the glass fiber surfaces during the fiber forming process. A fugitive rheology modifier material may be added to the size composition. One embodiment of the composition includes a polyethylene oxide binder material and a polyphenylene sulfide thermoplastic polymer resin.

2 Claims, 2 Drawing Sheets

SIZE COMPOSITION FOR IMPREGNATING FILAMENT STRANDS

This is a continuation of application Ser. No. 07/722,431, filed Jun. 27, 1991 now abandoned, which is a continuation of Ser. No. 269,088, filed Nov. 9, 1988 now abandoned, which is a continuation of Ser. No. 024,951, filed Mar. 12, 1987, all of which are abandoned.

TECHNICAL FIELD

This invention relates to a size composition useful for impregnating a highly loaded, impregnated fibrous strand where the impregnation takes place during the fiber forming operation. In one of its more specific aspects, this invention relates to a thermoplastic powder impregnated glass fiber strand.

BACKGROUND OF THE INVENTION

The production of impregnated fibers and the application of thermoplastic resins to the fibers is well-known. Such fibers are coated with the thermoplastic resin after the fiber strand has been formed.

Sizing compositions typically employed as coatings for glass fibers have conventionally been applied to the surface of the glass fibers after the glass fiber has been formed. Typically it is necessary to first produce the glass fibers by providing a thin layer of a size composition to the surface of the bare glass fibers. The size composition must be compatible with the glass fiber and the resin which is subsequently applied to the sized fiber. The size composition serves to improve the bonding relationship between the glass fibers and the polymeric or thermoplastic resins. The glass fibers are then collected into a strand and the strand is wound around a take-up bobbin to form a substantially cylindrical package, conventionally termed a "yarn package". The yarn package is then air dried or subjected to elevated temperatures in order to dry the size composition applied to the surface of the glass fibers. The glass fibers are thereafter impregnated with the thermoplastic resin to form an impregnated yarn or cord.

However, it is difficult to produce a high performance thermoplastic impregnated glass fiber strand. Normally, the size composition include various processing aids which aid in improving the bonding relationship between the thermoplastic resin and the glass fibers. However, these processing aids remain in the impregnated strand. The processing aids are undesirable materials when clean thermoplastic impregnated glass fibers are desired, such as for use in producing high performance thermoplastic impregnated fibrous strand.

Considerable time and expense would be saved if a size composition useful for impregnating strands with a thermoplastic resin were available which could be applied during the fiber forming process without the need for non-aqueous solvents, fluidized beds, sheaths or time-consuming manufacturing processes.

Moreover, it would be beneficial if a size composition could be employed which, when directly blended with the thermoplastic resin during the glass fiber forming process, produces a substantially pure thermoplastic impregnated glass strand.

SUMMARY OF THE INVENTION

According to the present invention, there is provided a slurry composition for impregnating glass fibers which includes a thermoplastic resin and fugitive processing aids such as a binder or film former material and a thickening agent (or rheology modifier). The slurry composition or the present invention includes the use of fugitive processing components together with a non-fugitive polymer to obtain a "prepreg" of the non-fugitive polymer. The slurry composition is applied to the glass fiber during the fiber forming operation. The composition of this invention can thus be applied as a size for glass fibers during the fiber forming operation and the resulting sized thermoplastic impregnated glass fibers can then be fabricated into glass fiber reinforced products.

According to the present invention, there is no need to first apply a siding composition to the glass fibers and thereafter impregnate the resulting sized glass fibers with a compatible polymeric resin matrix in order to provide a thermoplastic reinforced fibrous strand. The slurry composition or the present invention provides a sized glass fiber impregnated with a compatible polymeric resin matrix. The impregnated glass fiber is free or undesired processing materials and is therefore useful for various high performance glass reinforced end use items.

These and other aspects and advantages of the present invention will become clear after consideration is given to the detailed description of the invention which follows.

DETAILED DESCRIPTION OF THE INVENTION

Figure 1:
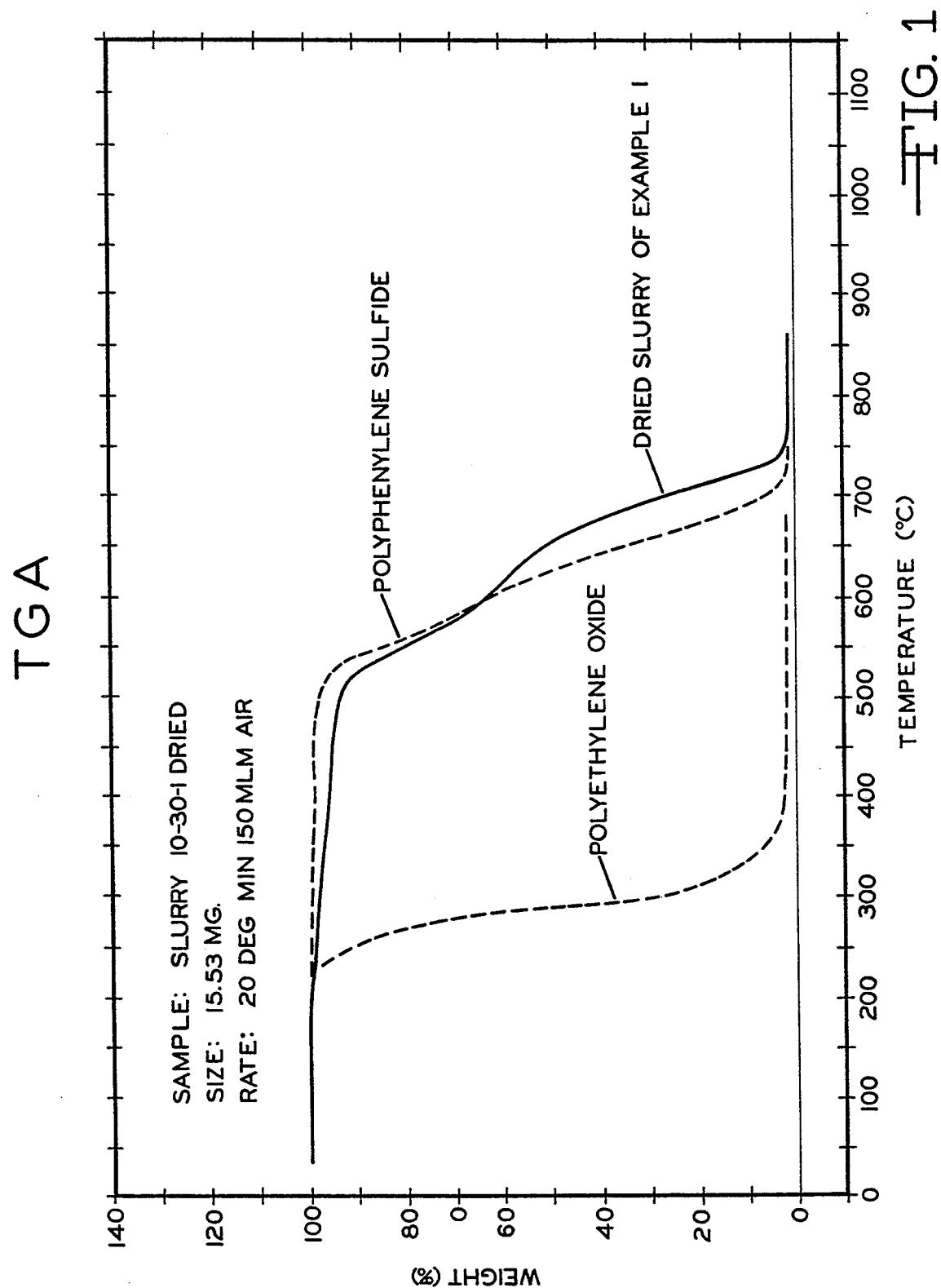
FIG. 1 is a graph showing the thermogravimetric analysis of a slurry containing polyphenylene sulfide.

The present invention relates to a slurry composition useful for producing an improved yarn or strand (bundle of filaments) pre-impregnated with a thermoplastic polymer during the filament forming operation.

The present invention is compatible with any glass fiber conventionally utilized for the reinforcement of polymeric resins. The term "glass fibers" as used herein shall mean filaments formed by attenuation of one or more streams of molten glass and to strands formed when such glass fiber filaments are gathered together in the forming process. The term shall also mean yarns and cords formed by applying and/or twisting a multiplicity of strands together and to woven and non-woven fabrics which are formed of such glass fiber strands, yarns, or cords.

The individual components utilized in the practice of this invention are commercially available and can thus be simply blended with one another in the preparation of the formulation embodying the features of the present invention.

Generally, the composition of this invention may contain a carrier solvent, normally water, a coupling agent, and fugitive processing aids such as a binder or film former material, a thickener or rheology modifier material, and a matrix thermoplastic resin powder dispersed in the sizing to form a slurry.

Any suitable coupling agent can be employed in the successful practice of this invention. The coupling agent acts to produce adhesion between the matrix resin and provide strength development and retention of the matrix resin in the slurry. One example of a suitable coupling agent is a silane such as a diamine silane (Z6020 from Dow Corning). The coupling agent can be contained in an amount of about 1.2 percent, by weight, of the slurry mixture.

Any suitable fugitive binder material can be employed. Alternatively, the fugitive thickener material may be the same materials as the binder material. The binder or film former material aids in the handling and processing of the filament during the fiber forming process. Suitable binder or film former materials are, for example, epoxy, polyester, polyvinyl acetate, polyvinyl alcohol, acrylics, or other chemicals which have the ability to bond the thermoplastic powder particles to the fiber upon the evaporation of the water or which have the ability themselves to suspend the particles in the slurry and subsequently bond themselves to the fiber. One example of a suitable fugitive binder material is polyethylene oxide. The binder material will be contained in an amount within the range of from about 1.0 to about 1.2 percent, by weight, of the slurry mixture.

Any suitable fugitive thickener material can be employed. The thickener material acts as a theology modifier so that the thermoplastic powder particles will actually adhere to the fiber. Without the thickener material the thermoplastic powder particles may stay behind on the rolls of the applicator while the carrier solvent goes on the fiber. The result would be a rapid build-up of powder on the applicator rolls, which in turn, rapidly causes fiber breakage.

The thermoplastic resins are dispersed into the sizing in the form of fine particles. One example of a resin is polyphenylene sulfide. In a preferred embodiment the size of the powder particles are less than about 125 microns. According to the present invention the resin powders can be applied to the filaments in an amount within the range of between about 5 to about 50 percent, by weight, or the final prepreg yarn or strand.

According to the present invention the sizing composition suspends the thermoplastic powder particles in the slurry. The slurry compositions of this invention are best produced by blending all materials in their liquid state with agitation. A uniform coating of the composition can be applied to the glass fibers in any suitable manner during the fiber forming process. Preferably, the compositions of the present invention are applied to the surface of the glass fiber in the manner described in U.S. Pat. No. 5,026,410 issued Jun. 25, 1991 on Ser. No. 269,089, filed Nov. 9, 1988, a continuation of Ser. No. 024,953, filed Mar. 12, 1987, abandoned (the entire disclosure thereof being expressly incorporated herein to by reference). The resultant slurry composition is sufficiently liquid to be applied to the fibers during the fiber-forming operation. Each fiber is coated by the slurry mixture as the fibers are formed, that is, at or about the place in their formation where the conventional size compositions are typically applied (e.g., between the bushing and the spindle on which the fibers are wound as a package). In one fiber forming process, the continuous fibers leave the bushing and are dipped into the slurry and are impregnated with the slurry.

The impregnated strand of glass fibers has a coating thereon, the coating being present on the strand in an amount ranging from 20 to 26.2 weight percent based on the weight of the impregnated strand wherein the coating is a dried slurry of an aqueous composition consisting essentially of:

| Material | Amount By Weight Percent |
|---|---|
| Polyphenylene sulfide thermoplastic resin powder having an average particle size of about 125 microns or less | 30 to 50 |
| diamine silane coupling agent | 0.05 to 5.0 |
| polyethylene oxide thickener material | 0.05 to 5.0 |
| water | balance to 100% |

It is also within the contemplated scope of this invention that organic or inorganic particulates, such as metallic fillers useful in producing conductive rovings, may also be used with the thermoplastic polymer powder particles. These fillers can either be pre-combined with the polymer so that each powder particle contains polymer and filler or be added separately as a powder to the slurry.

The resultant impregnated strands can be chopped, either before or after drying, to be used for such operations as injection molding. Continuous thermoplastic impregnated strands can be filament wound or pultruded to achieve thermoplastic fiber reinforced end use items.

High performance thermoplastic resins exhibit advantages over thermosetting polymers when used as a matrix resin in fiber reinforced compositions. These advantages include better high temperature performance, better hydrolysis resistance, better impact properties, better electrical properties, better chemical resistance and better dielectric properties.

A convenient way to fabricate a fiber reinforced high performance thermoplastic is to use pre-impregnated thermoplastic strands. This is especially useful for high performance thermoplastic reinforced with continuous fibers. This invention describes such a thermoplastic pre-impregnated strand.

A thermoplastic powder is dispersed in water. Usually, a surfactant is added to the water to help wetting of the powder. A thickener, usually a water soluble polymer, is added to build-up the viscosity of the liquid phase. Other additives such as silane coupling agents can also be added to the aqueous suspension (also called "slurry"). This slurry is used as a size and applied to glass fibers as they are being formed, as disclosed in U.S. Pat. No. 5,026,410. The thickener is chosen so that it is thermally decomposed into volatile products at a temperature inferior to the decomposition temperature of the thermoplastic powder and which is decomposed in the presence of this thermoplastic, even after this thermoplastic has been fused, without objectionally deteriorating the properties of this thermoplastic. Examples of such thickeners include polyethylene oxide, hydroxypropylcellulose, starch, and hydroxyethylcellulose. This thickener may also be used as a "binder". The binder is used to hold the thermoplastic powder on the strand of fibers upon drying, and therefore providing an impregnated strand having good integrity. Alternatively, the binder may be an additional ingredient added to the slurry; however, the thickener chosen is also thermally decomposable. The wetting agents chosen are also volatile or thermally decomposable at an appropriate temperature.

Once the slurry is applied to the glass fiber, the forming package is dried. Subsequently, the thermoplastic impregnated fiber is heated to a temperature above the fusing temperature of the thermoplastic powder so that the powder is totally or partially fused or held to the fibers without having to rely on a binder. This heating step may include, or be preceeded by, partial decomposition of the fugitive ingredients, thus, completing decomposition of the fugitive ingredients at a temperature above or below the fusing temperature of the thermoplastic. Any of these steps may be combined with modification of the thermoplastic such as "curing" of "annealing".

EXAMPLE 1

A fine powder (<125 microns) of a high performance thermoplastic such as polyphenylene sulfide powder (Ryton VI from Phillipps Chem.) is dispersed in a water solution of a wetting agent in the following proportions: (parts by weight) 1200 parts water; 4 parts Tergitol Nin Foam 2x (from Union Carbide) which are stirred together; add: 800 parts Ryton VI and stir until good wetting is achieved; add 14800 parts water and stir.

This slurry is poured in small quantities through a 115 mesh sieve to separate the powder into coarse and fine fractions. The slurry is passed through the sieve, collected and allowed to settle for at least 12 hours. The powder which has settled is collected by passing through 115 mesh. The liquid on top (later called water/surf) is also collected.

A slurry of the following composition is prepared: 1200 parts Ryton VI through 115 mesh (equivalent dry powder); 2764 parts water/surf; add 48 parts polyethylene oxide (Polyox WSR 205 from Union Carbide) mix well until homogeneous. This provides a slurry containing 31.1% solids. The glass fibers are coated as they are being formed with the slurry described above. The slurry is applied with a standard size applicator fitted with a doctor blade to control the film thickness on the applicator roll.

Two forming packages having 2000 filaments/strands are made as follows:

| Package #1 | total amount of solids on glass = 21.1% |
| Package #2 | total amount of solids on glass = 20.0% |

The package #1 is dried for one day at room conditions. The package (after substituting a steel for a cardboard forming tube) is then placed in an air oven at 300° C. for 1 hour. The polyphenylene sulfide fuses, the polyoxyethylene oxide thermally decomposes into volatile matter and the polyphenylene oxide cures into a higher molecular weight polymer. When the package is removed from the oven and cooled, the strand of impregnated glass can be easily unwound from the package inspite or the high amount or impregnating resin.

This strand is filament wound in a mold to form a unidirectional composite. The strands can then be compression molded into end use items. The measured flexural strength of 114K psi indicates that the strand has useful mechanical properties.

Package #2 is dried in the same manner as package #1 but before fusing the polyphenylene sulfide the strand is wound onto a plate to form unidirectional layers. The plate is then placed in an oven at 300° C. for 1 hour as was done for package #1 above. The unidirectional layers fuse into a sheet which can later be used for compression molding unidirectional composites. The measured flexural strength is 120,000 psi which also indicates useful mechanical properties.

EXAMPLE 2

A fine powder (<125 microns) of a high performance thermoplastic such as polyphenylene sulfide powder (Ryton VI from Phillipps Chem.) is dispersed in a water solution of a wetting agent in the following proportions: (parts by weight) 1200 parts water; 4 parts Tergitol Nin Foam 2x (from Union Carbide) add: 800 parts Ryton VI and stir until good wetting is achieved; add 14800 parts water and stir. This slurry is poured in small quantities through a 115 mesh sieve to separate the powder into coarse and fine fractions. The slurry is passed through the sieve, collected and allowed to settle for at least 12 hours. The powder which has settled is collected by passing through 115 mesh. The slurry of the following composition is prepared: 1200 parts Ryton VI through 115 mesh (equivalent dry powder); 2764 parts water/surf; add 42 parts polyethylene oxide (Polyox WSR 205 from Union Carbide) and 48 parts diamine silane (Z6020 from Dow Corning). This provides a slurry containing 31.8% solids. The glass fibers are coated as they are being formed with the slurry described above. The slurry is applied with a standard size applicator fitted with a doctor blade to control the film thickness on the applicator roll. A forming package having 2000 filaments/strands is made.

| Package #1 | total amount of solids on glass = 26.2% |

The package is dried for one day at room conditions. The strand is wound onto a plate to form unidirectional layers. The plate is then placed in an air oven at 300° C. for 1 hour. The polyphenylene sulfide fuses, the polyoxyethylene oxide thermally decomposes into volatile matter and the polyphenylene sulfide cures into a higher molecular weight polymer. When the plate is removed from the oven and cooled, the unidirectional layers fuse into a sheet which can be used for compression molding unidirectional composites. The measured flexural strength indicates useful mechanical properties: 150,000 to 190,000 psi, depending on molding conditions which indicates useful mechanical properties.

Figure 2:
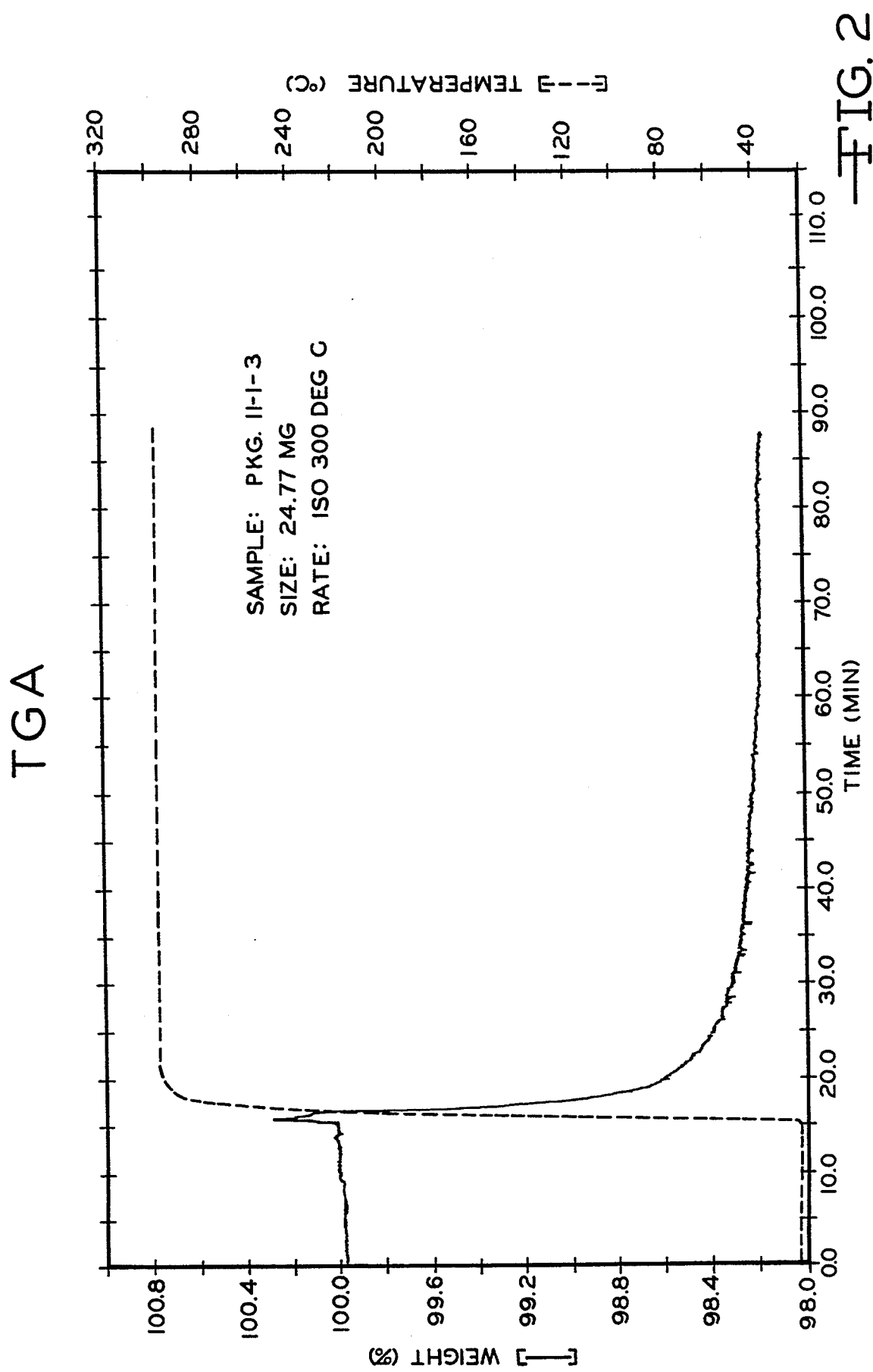
FIG. 2 is a graph showing the thermogravimetric analysis of a glass fiber impregnated with the slurry shown in FIG. 1.

Thermogravimetric analysis (TGA), as shown in FIGS. 1 and 2, confirms the removal of fugitive components through thermal degradation. In a first series of tests the sample is heated at a uniform rate of 20 degrees centigrade per minute and the sample weight is recorded as a function of temperature.

FIG. 1 shows that pure polyphenylene sulfide (PPS) exhibits nearly no degradation below 300° C. and very little loss weight up to 500° C. On the other hand, polyethylene oxide used as a fugitive thickener and binder starts to degrade at 200° C. and has nearly completely volatilized by the time the temperature reaches 400° C. The solid curve shows the weight loss of the dried slurry as the temperature increases. The weight loss from 200° C. up to point A is due to the loss of polyethylene oxide in the slurry. Above point A, the loss in weight in the remaining PPS in the dried slurry is essentially the same as the loss in weight in pure PPS.

In another thermogravimetric analysis shown is FIG. 2, glass impregnated with the slurry described in example 1, and dried, is suddenly exposed to a temperature of 390° C. (to simulate the thermal history of the dried impregnated glass placed in an oven at 300° C. for 1 hour). The weight of the sample was followed. As can be seen in FIG. 2, within 5 to 10 minutes, most of the volatile materials thermally decomposed and the volatile materials have been removed. After 1 hour there is no further weight loss. The recorded weight loss of (100−98.2)=1.8% is due to the loss of the polyethylene oxide, a small amount of volatiles in PPS and residual moisture in the strand.

While reference has been made to the preferred formulation in accordance with the present invention, those skilled in this art may recognize that various modifications may be made, which modifications shall accorded the broadest scope of the appended claims so as to encompass all equivalent formulations, compositions and the like.

We claim:

1. An impregnated strand of glass fibers having a coating thereon, the coating being present on the strand in an amount ranging from 20 to 26.2 weight percent based on the weight of the impregnated strand wherein the coating is a dried slurry of an aqueous composition consisting essentially of:

| Material | Amount By Weight Percent |
|---|---|
| Polyphenylene sulfide thermoplastic resin powder having an average particle size of about 125 microns or less | 30 to 50 |
| diamine silane coupling agent | 0.05 to 5.0 |
| polyethylene oxide thickener material | 0.05 to 5.0 |
| water | balance to 100% |

2. An impregnated strand according to claim 1 wherein the aqueous composition include a surfactant.

* * * * *